No. 806,817. PATENTED DEC. 12, 1905.
A. C. MATHER.
WATER WHEEL.
APPLICATION FILED AUG. 8, 1904.
6 SHEETS—SHEET 5.
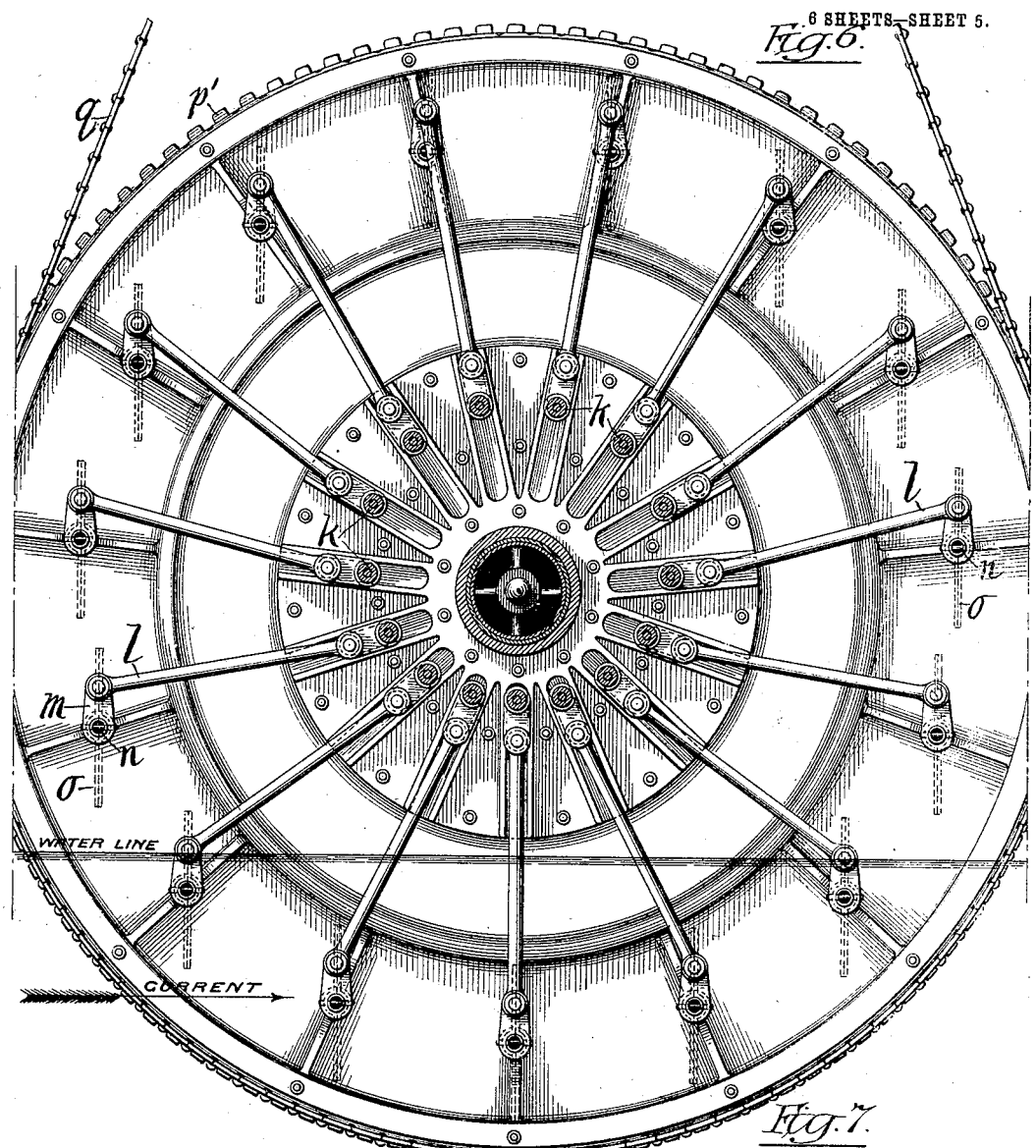
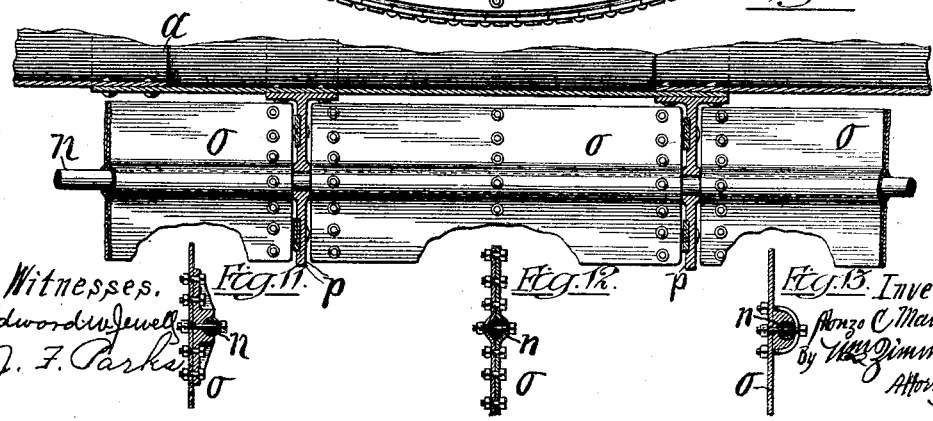

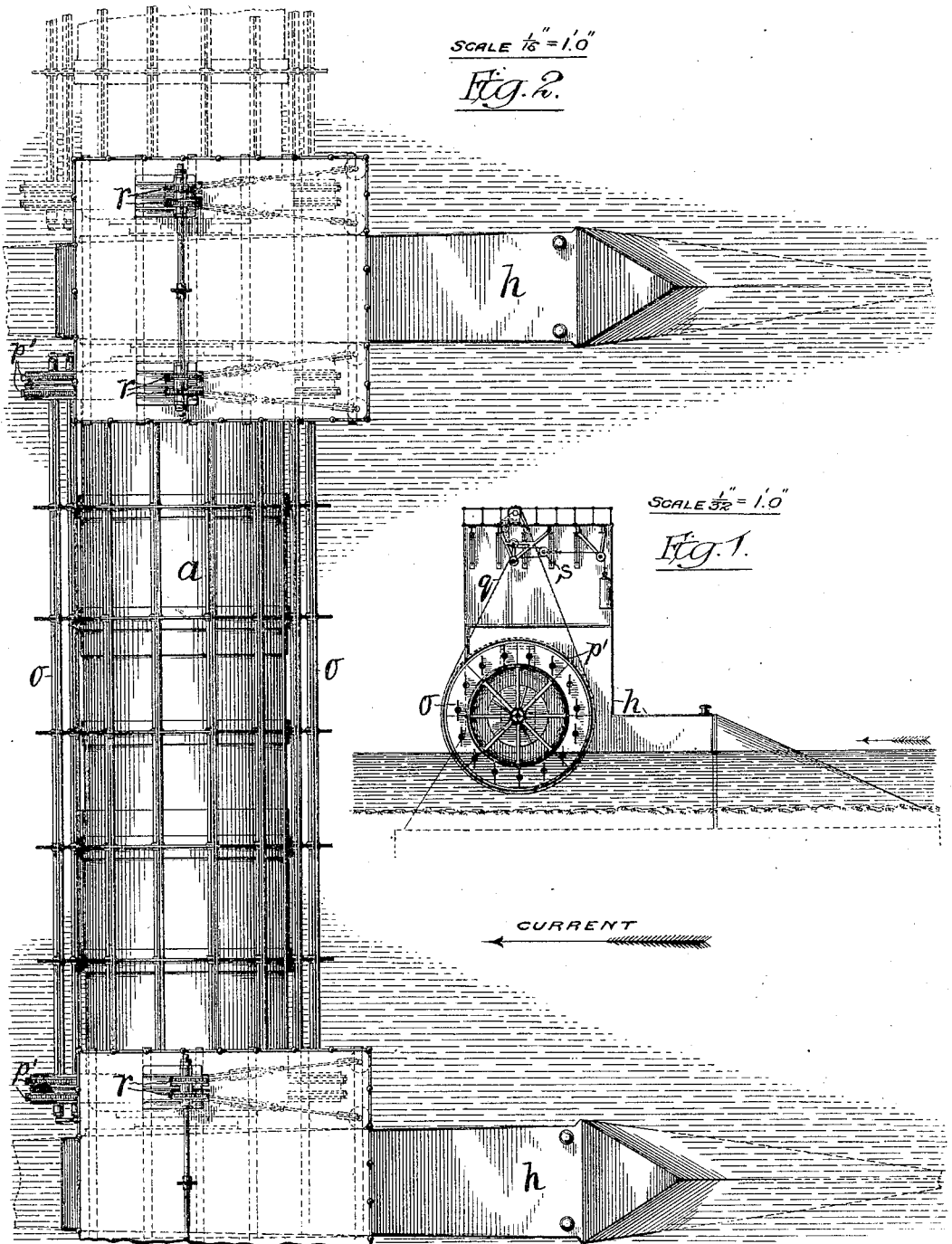

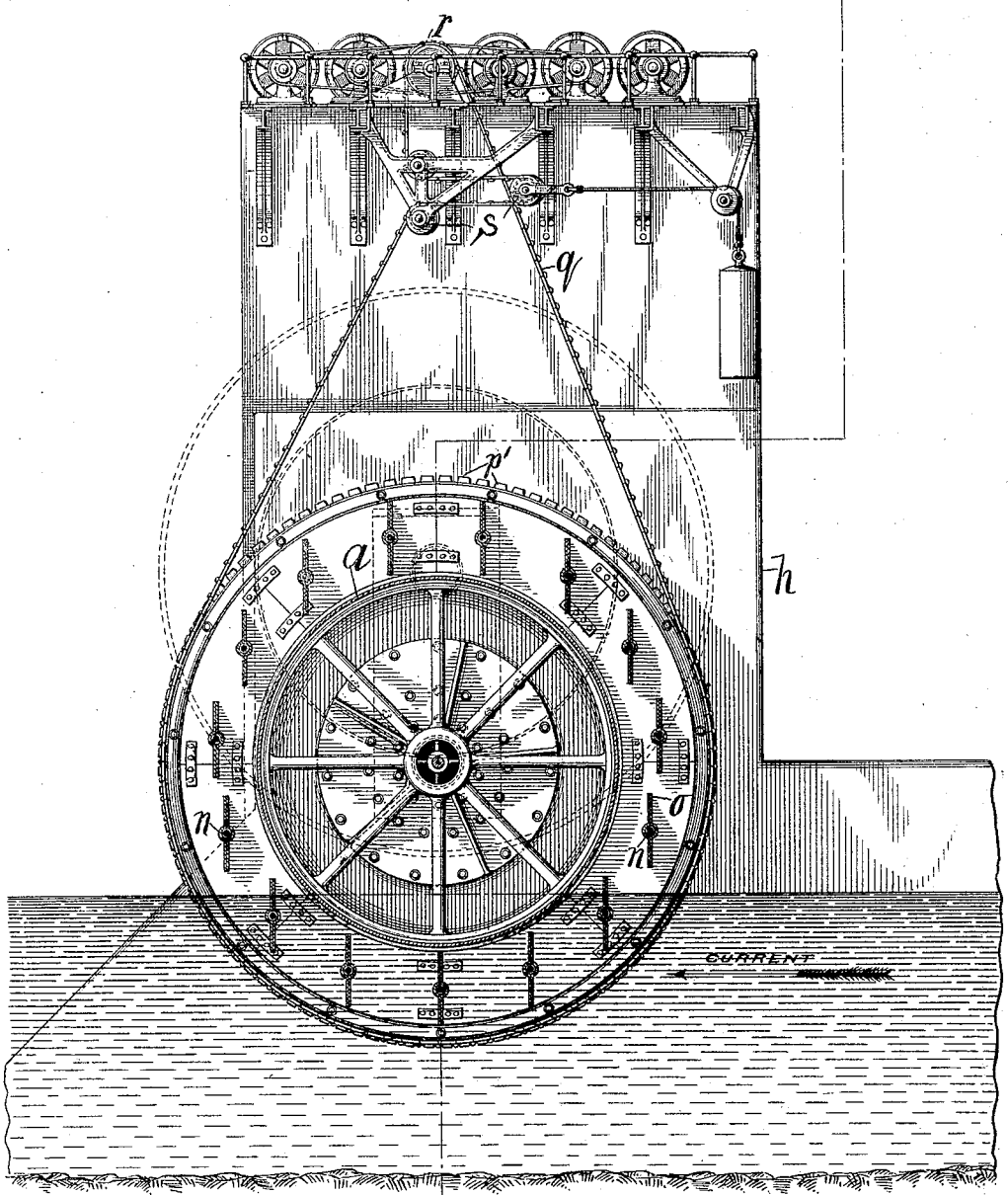

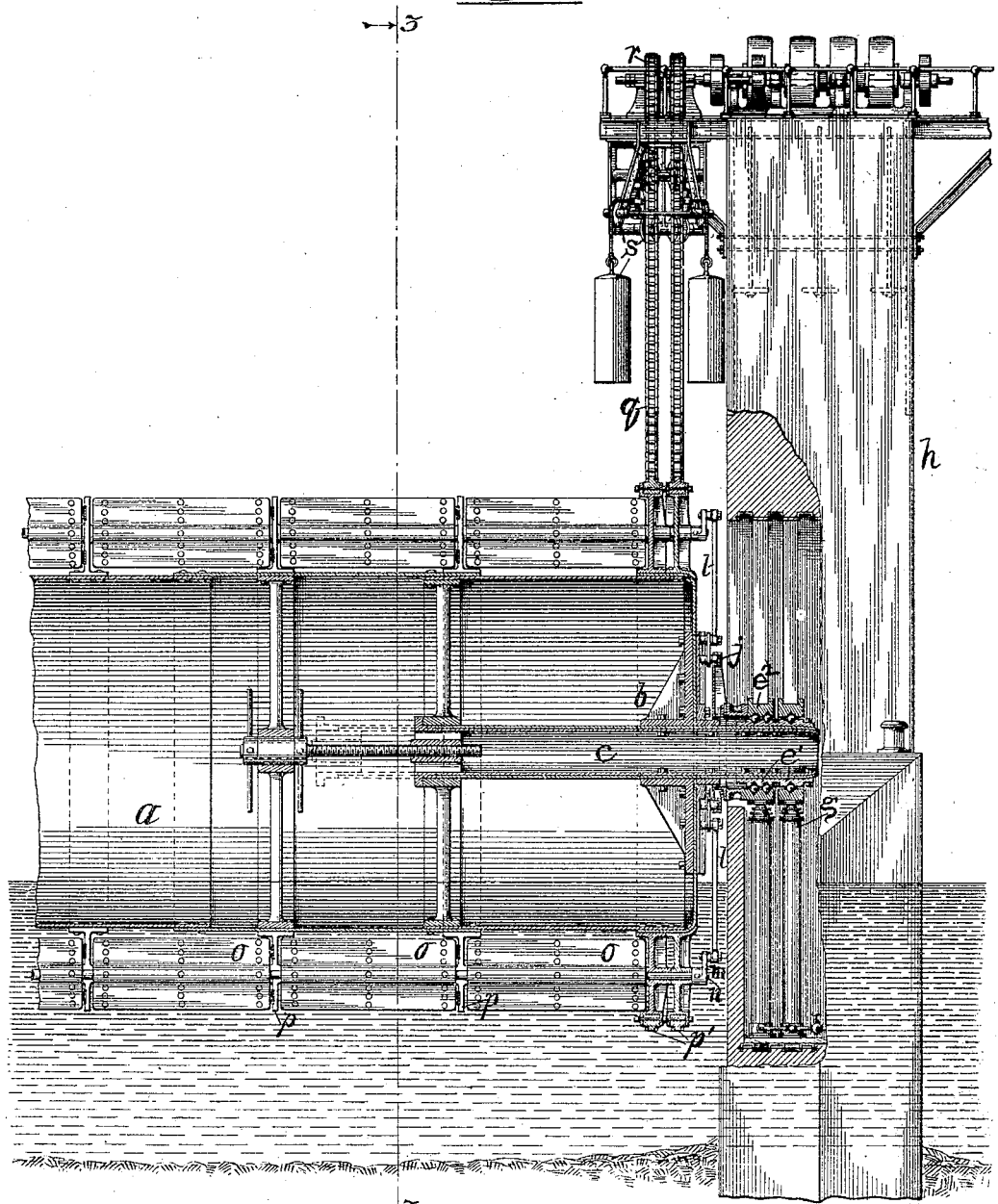

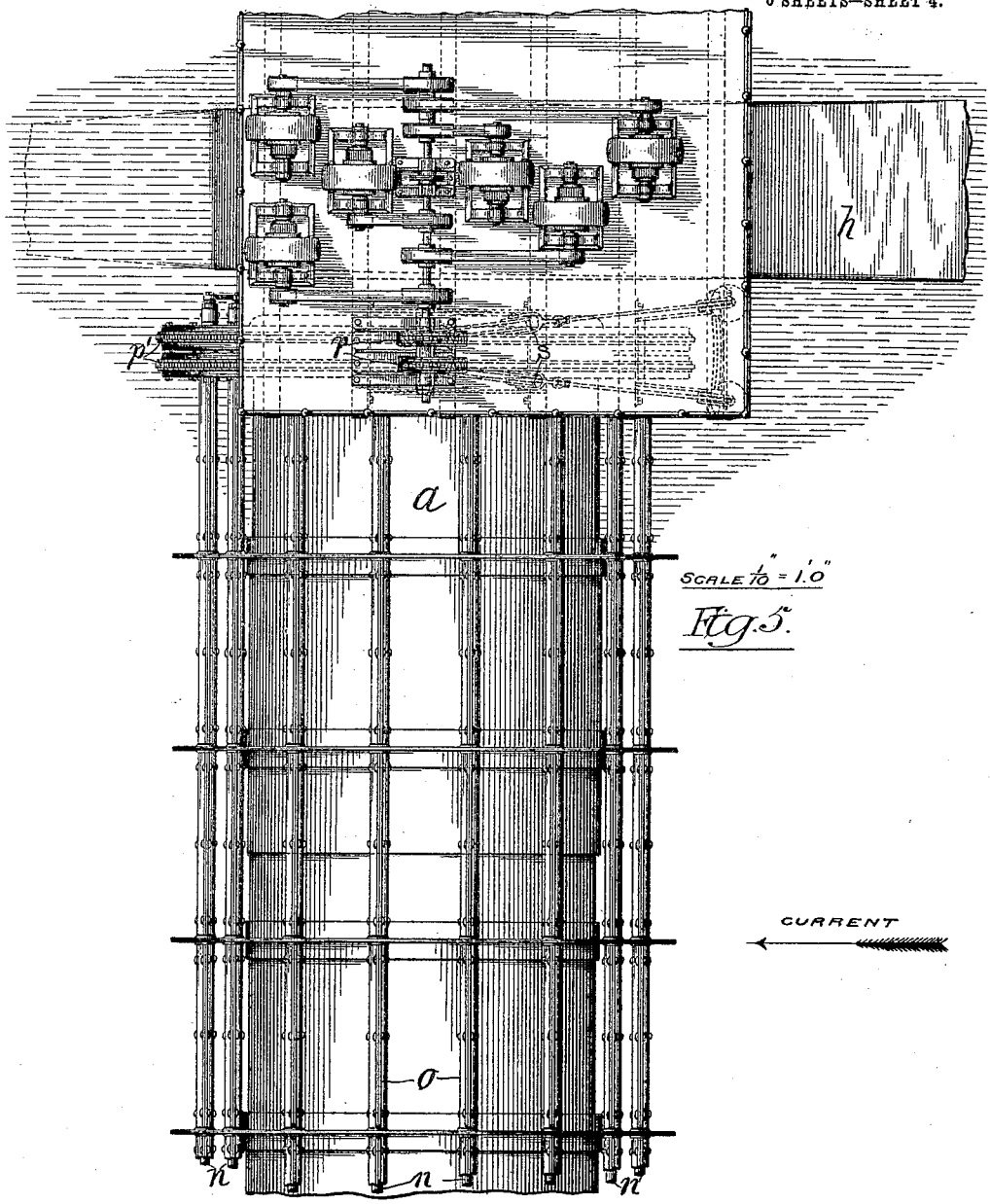

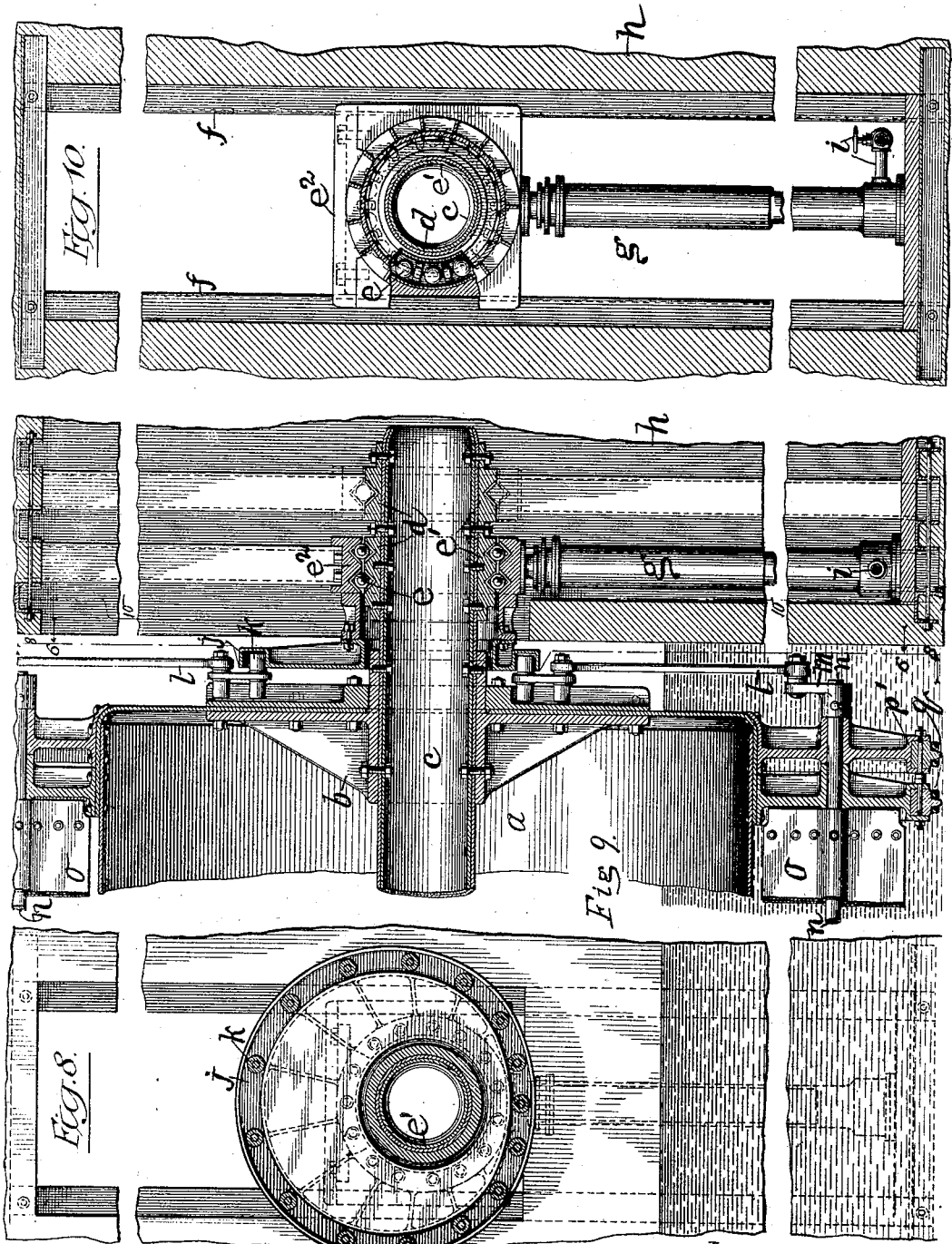

UNITED STATES PATENT OFFICE.

ALONZO C. MATHER, OF CHICAGO, ILLINOIS.

WATER-WHEEL.

No. 806,817.  Specification of Letters Patent.  Patented Dec. 12, 1905.

Application filed August 8, 1904. Serial No. 220,013.

*To all whom it may concern:*

Be it known that I, ALONZO C. MATHER, a citizen of the United States, residing at Chicago, in the county of Cook and State of Illinois, have invented certain new and useful Improvements in Water-Wheels, of which the following is a full, clear, and exact description, as shown in the accompanying drawings, in which—

Figure 1 shows a water-wheel in end elevation having its near support removed and showing the farther pier and the transmitting mechanism from the wheel to the top of the pier. Fig. 2 shows the same mechanism that is shown in Fig. 1 in plan view, on a scale double to that shown in Fig. 1, showing the distance apart of the piers and the transmitting machinery. Fig. 3 shows a part of the pier and a transverse section of the water-wheel on the cutting plane 3 3 of Fig. 4, the pier being shown unbroken except that its point is shown broken away and the extreme up position of the water-wheel indicated in broken outlines. Fig. 4 shows a central sectional longitudinal front view of a part of the water-wheel and a portion of one pier on the cutting plane 4 4 of Fig. 3. It also shows the ball-bearings on their hydraulic lifts and a reciprocable gudgeon. Fig. 5 shows a plan on top view of Fig. 4 on the same scale as Fig. 4, but the water-wheel is entire in circumference and the point of the pier is broken away. Fig. 6 shows, on a scale double to that on which Figs. 3 and 4 are shown, an end view of the water-wheel and its mechanism for operating the feathering-paddles, also the sprocket-wheel and a part of its chain, taken on the cutting plane 6 6 of Fig. 9. Fig. 7 shows, on the same scale as Fig. 6, a fragment of the lower part of the section of a water-wheel with fragments of a few buckets and two of their supports in section. Fig. 8 shows in end view a portion of a pier with its slot for the adjustable shaft-boxing and an end view of the cam which holds the mechanism which operates the feathering paddle-wheels, taken on the plane 8 8 of Fig. 9. Fig. 9 shows in central longitudinal vertical section a fragment of one end of the water-wheel, on the same scale as Fig. 6, the cam and connecting mechanism between it and the feathering-paddles and section of a fragment of the supporting-pier, the hollow gudgeon and the ball-bearings and the hydraulic lift under the ball-bearing casings or boxes. Fig. 10 shows a transverse view of Fig. 9, taken on the cutting plane 10 10 of Fig. 9, thus showing a gudgeon-support in end view in its guides in the pier, only a fragment of the latter being shown, and the hydraulic lift under it. A part of the gudgeon-support is broken away to show the arrangement of ball-bearings for said gudgeon. Figs. 11, 12, and 13 show cross-sections of the shaft of the feathering-paddle shown herein to which the blade or paddle is shown attached in three modified forms of construction.

Like reference-letters denote like parts throughout.

The object of my invention is to improve the construction and operation of water-wheels, and specifically that class known as "current-wheels;" and my said improvement consists, more specifically, in the manner of mounting such wheels and in constructing and applying their journal-boxes and journals to such wheels, more particularly when applied to wide and rapid streams, the manner and mechanism through which the power derived from such wheels is taken and transmitted to fixed machinery, and in other minor details to be hereinafter set forth.

I attain my said desired ends by mechanism constructed substantially as follows, namely:

My water-wheel is a very long sheet-metal drum $a$, with reinforced axle ends $b$, holding reciprocable gudgeons $c$, which pass into rings $e'$, fastened to said gudgeons, and which form the inner half of ways for balls $e$, which with their outer parts form ball-bearings $e^2$, whereof the opposite ends are slotted and run on vertical guides $f$, and said bearings are carried on hydraulic lifts $g$ in openings in piers $h$ built into the stream. Said guides form parts of the sides of the openings in said pier, and said openings are grooved on their faces, as shown in Fig. 9, to receive the ends of said parts $e^2$. A pipe and gate $i$ control the water-entrance to said hydraulic lift. To the face of the part $e^2$ is attached an eccentric cam-groove $j$, in which play rollered studs $k$, attached to links $l$, whereof the free end is attached to a crank $m$, which is attached to the paddle-shaft $n$, which holds the floats or paddles $o$, and the shaft $n$ is carried in brackets $p$, attached to the drum $a$. The same brackets when placed on the end of the drum are provided with sprockets and are brackets $p'$, on which run chains $q$, which drive a pulley $r$, placed on the pier $h$, and intermediate said pulley and sprocket-wheel is a system of idler wheels and weights $s$, which keep the chain $q$ taut in any of the possible positions of the water-wheel. From the shaft of said pulley $r$ power may be transmitted to other machinery, one form of which is indicated near the pulley $r$. This water-wheel having its body built of sheet metal may be made water-tight and very long, and thereby it can be lowered, more or less, into the water, and thus partly floated, receive more power from the water, and have so much less weight on its journals.

My said new water-wheel is moved to its place on a flat-boat, and its gudgeons are within the wheel-heads. Under said condition the wheel is floated to its place and held by ropes and adjusted by them until the axis of the gudgeons is in the vertical axial plane of the ball-bearing, and then the boat is lightened or lowered and the ball-bearing moved, if necessary, until the axis of the gudgeons coincides with the axis of the ball-bearing mechanism, and then the gudgeons are moved out to place, after which the boat is freed, and then the wheel is hung to its place, where it may substantially be adjusted to the height desired by means of said hydraulic lifts.

What I claim is—

1. The combination with a partly-floated shell provided with paddles, of axially reciprocable and adjustable gudgeons, bearings for said gudgeons vertical guides for said bearings and hydraulic lifts provided with means to control and to stop the hydraulic action for said bearings.

2. The combination with a shell having paddles, of reciprocable gudgeons and means to operate said gudgeons on the interior of the wheel provided with bearings, vertical guides for said bearings and means to guide said gudgeons, axially, and means to lift and to hold them.

3. The combination with a floating drum provided with feathering-paddles of interiorly-operated and longitudinally-reciprocable gudgeons, vertically-reciprocable and hydraulically-operated bearings for said gudgeons, a sprocket-wheel to said drum, a chain to said sprocket-wheel and a pulley actuated by said chain, and automatic tension mechanism to said chain.

4. The combination with a drum provided with floats, and reinforced heads, of axially reciprocable and adjustable gudgeons capable of entering within said heads and mechanism on the inner ends of said gudgeons to operate them.

5. The combination with a water-wheel and longitudinally-reciprocable and interiorly-adjustable gudgeons therefor, of vertically-adjustable bearings for said gudgeons vertical guides for said bearings and hydraulic lifts with means to regulate said bearings.

6. The combination with a pier provided with vertical guides, of vertically-reciprocable gudgeon-bearings in said guides, hydraulic lifts to said bearings, and axially reciprocable and adjustable gudgeons for said bearings.

ALONZO C. MATHER.

Witnesses:
WM. ZIMMERMAN,
ANDREW CUMMINGS.